Feb. 10, 1970 N. GOLDBERGER 3,494,402
MOLDED HARD RUBBER AIRLESS TIRE FOR AN AUTOMOBILE WHEEL
Filed Jan. 31, 1969 2 Sheets-Sheet 1
Fig. 1.
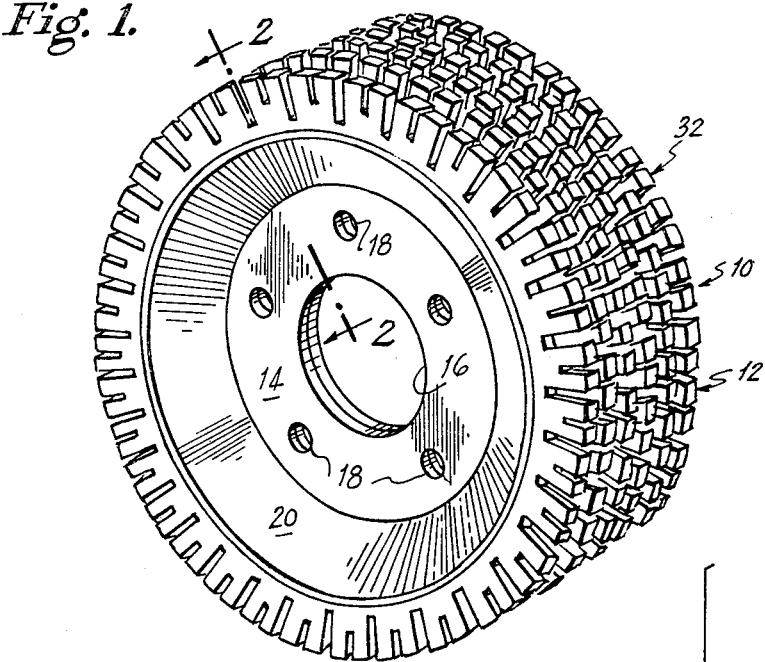
Fig. 3.
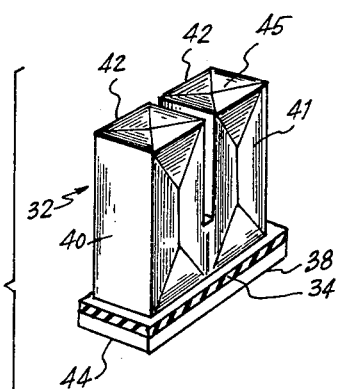
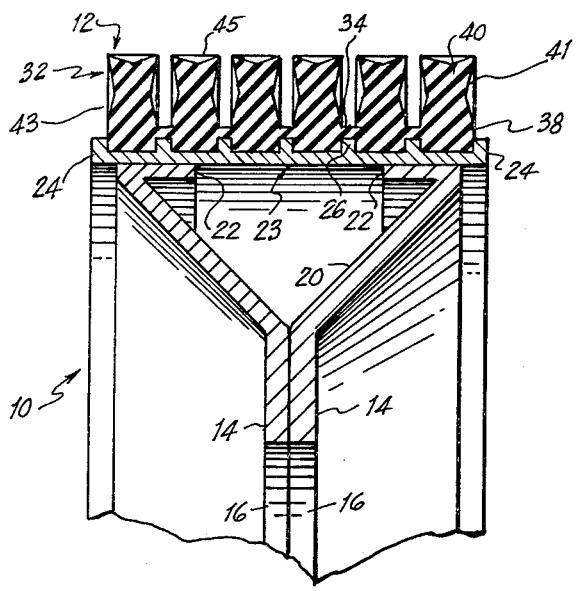
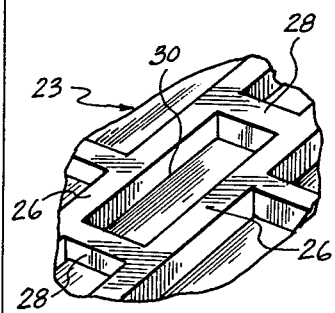
Fig. 2.
INVENTOR.
NANDOR GOLDBERGER
BY
Polachek & Saulsbury
ATTORNEYS.

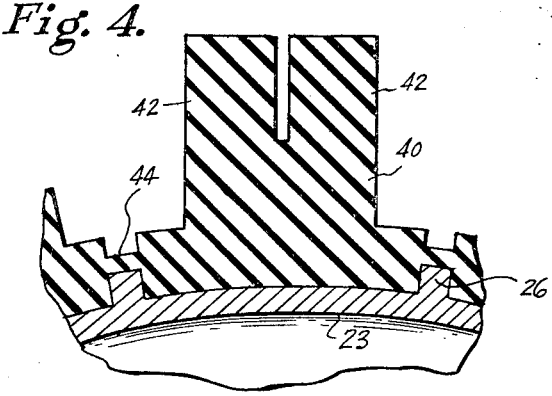
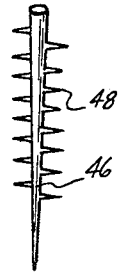
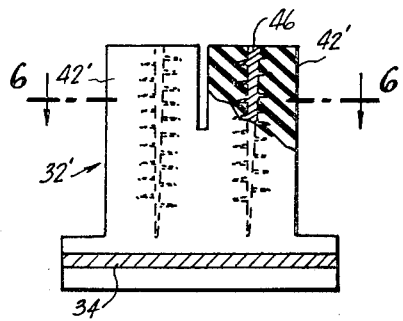
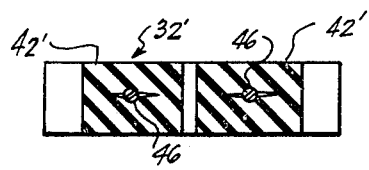
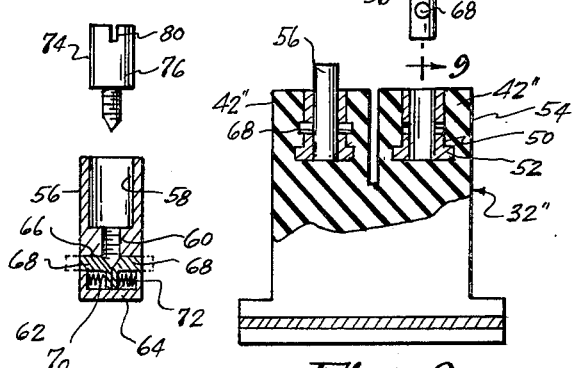
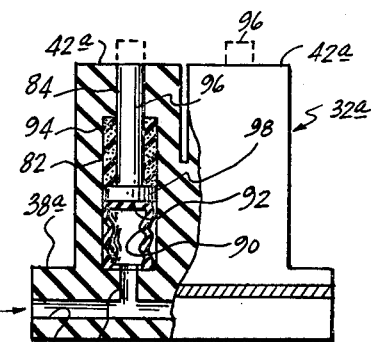

United States Patent Office 3,494,402
Patented Feb. 10, 1970

3,494,402
MOLDED HARD RUBBER AIRLESS TIRE FOR AN AUTOMOBILE WHEEL
Nandor Goldberger, 100 Central Park S.,
New York, N.Y. 10019
Filed Jan. 31, 1969, Ser. No. 795,621
Int. Cl. B60c 7/24
U.S. Cl. 152—323                    10 Claims

ABSTRACT OF THE DISCLOSURE

A hard rubber molded tire for an automobile wheel having a plurality of spaced rows of integral lugs, the lugs being individually joined peripherally of the tire at their base portions, and the rows of lugs being joined at the base portions of the lugs. The lugs are solid with bifurcated ends. In modified forms of the tire, the bifurcations of the lugs are reinforced with metal inserts.

This invention relates generally to automobile wheels and more particularly to a hard rubber tire for such wheels.

A principal object of the present invention is to provide a hard rubber tire with flexible peripheral rubber lugs that simulate pneumatic surfaces of wheels, yet are puncture proof and provide the necessary traction.

Various objects, features and advantages of the invention will become apparent upon reading the following specification together with the accompanying drawing forming a part thereof.

Referring to the drawing:

FIG. 1 is a perspective view of a rubber tire embodying the invention shown in position on an automobile wheel.

FIG. 2 is an enlarged cross-sectional view taken on the plane of line 2—2 of FIG. 1.

FIG. 3 is a spread perspective view of a portion of the rim of a wheel and a portion of the tire preparatory to mounting onto the wheel.

FIG. 4 is an enlarged vertical sectional view through one of the lugs of the tire.

FIG. 5 is a front elevational view of a modified form of lug, parts being shown broken away and in section.

FIG. 6 is a cross-sectional view taken on the plane of line 6—6 of FIG. 5.

FIG. 7 is a side elevational view of the rod used in the lug of FIG. 5.

FIG. 8 is a part elevational and part sectional view of another modified form of lug, parts being shown removed.

FIG. 9 is a view of the parts of FIG. 8 in operative position with a tool shown preparatory to moving the parts.

FIG. 10 is a view partly in elevation and partly in section of another modified form of lug.

Referring now in detail to the various views of the drawing, an automobile wheel 10 is shown with a tire 12 made in accordance with the invention mounted thereon. The wheel 10 comprises a disc-shaped body composed of a pair of central juxtaposed circular plates 14, 14 with central aligned openings 16 therethrough. The plates are secured together by fastening elements 18 and are tapered laterally along the outer peripheries indicated at 20. The tapered portions 20 terminate in inwardly opposed annular flanges 22, 22. An annular rim 23 is supported fixedly in the outer peripheries of the flanges 22. The rim is formed with outwardly projecting peripheral flanges 24 and with intermediate spaced annular outwardly extending flanges 26. Flanges 28 extend across the spaces between adjacent parallel flanges 26. The flanges 26 and 28 constitute a honeycomb structure providing recesses 30 between the flanges 26 and 28 and rim body.

The tire 12 is mounted on and interlocked with the honeycomb structure on the rim 23 of the wheel 10. The tire is molded of hard rubber and comprises a plurality of annular rows of rubber lugs 32 spaced transversely of the tire, six rows being shown. The adjacent rows of lugs are joined along the bases thereof by integral annular strips 34. Each lug 32 has a base portion 38 and a radially extending rectangular body portion 40. The body portion is bifurcated at its outer end forming bifurcations 42, 42. The front and rear surfaces of the bifurcations are dished as indicated at 41 and 43, respectively, and the top surfaces thereof are dished as indicated at 45. The ends of the adjacent individual bases of the lugs are joined in longitudinal arrangement by joints 44.

In assembling the tire 12 on the rim 23 of the wheel, the bases 38 of the lugs 32 are inserted into the recesses 30 in the honeycomb structure on the surface of the rim. The joints 44 between the individual lugs 32 extend over the cross walls 28, 28 of the structure and the joints 34 between the lugs of the rows of lugs extend over the longitudinal walls 26, 26.

In use, when force is exerted against the lugs 32, said lugs will bend in various directions, to wit: forwardly, rearwardly and laterally, brushing along, serving to provide traction for the wheel, always returning to normal radial position. This operation is in imitation of the operation of the designs on a pneumatic tire.

In FIGS. 5 to 7, inclusive, a modified form of lug 32' is shown which differs from lug 32 of FIG. 1 in that a pointed rod 46 is molded in each of the bifurcations 42', 42' of the body of the lug. The rod is formed with opposed spurs 48. The rods strengthen the body and add a little rigidity thereto.

FIGS. 8 and 9 illustrate another modified form of lug 32''. In this form, each bifurcation 42'' is formed with a socket 50 in which is inserted a sleeve 52 provided with opposed holes 54. A flattened tubular casing 56 is slidably mounted in the sleeve 52. The casing has a socket 58 at one end communicating with a central internally screw threaded bore 60. The bore communicates with a recess 62 at the other end of the casing. The recess is closed by a cap 64. Opposed holes 66 are formed in the casing at the recess portion and slidably mounted in the recess is a pair of opposed pins 68 adapted to be pushed through the holes 66. The pins are formed with opposed adjacent bent ends 70 against which press coil springs 72 to hold the pins from outward movement. The pins are adapted to be separated and pushed outwardly through the holes 66 by means of a tool 74 having a cylindrical body portion 76 and a depending externally screw threaded stem 78 at the end. The other end of the body is slotted as indicated at 80 to receive a screw driver for turning the tool.

In use, the tool 74 is inserted through the socket 58 in the casing 56, the threaded stem 78 engaging the threaded bore 60 in the casing whereupon continued turning of the tool by means of a screw driver moves the stem through the bore into engagement with the adjacent ends of the pins 68 thereby spreading said pins and moving same through the holes 66 as shown in full lines in FIG. 8, against the action of the coil springs 72. The casing is interlocked in operative position by means of the pins 68 with its top end protruding above the top end edge of the lug 36''. The sleeves and casing reinforce the bifurcations of the lugs and the protruding casing 56 provide traction.

In FIG. 10, still another modified form of lug 32a is shown. In this form, the body of the lug 32a is formed with a central recess 82 centrally of each bifurcation 42a. The recess communicates at one end, the top end, with a central bore 84 intersecting the top end edge of the bifurcation. The other end of the recess communicates with a central bore 86 which communicates with a horizontal passage 88 formed in the base portion 38a of the lug 32a. A bellows 90 is installed in the recess 82 at the bottom end thereof. The bellows has a bottom open end and a closed top end 92. A rubber lining 94 is positioned in the recess above the bellows 90. A headed pin 96 is molded in the bifurcation and extends through the top bore 84 with its head 98 fixedly seated on the closed end of the bellows.

In operation, air from an air supply in the automobile is pumped through the passage 88 up through the bottom bore 86 into the bellows 90 expanding the bellows which, in turn, forces the pin 96 upwardly through the top bore 84 to a point above the top end edge of the bifurcation 42a where it serves to provide traction. When the bellows collapse, the pin is retracted.

What is claimed is:

1. A molded hard rubber tire for an automobile wheel comprising a plurality of rows of integral spaced radial lugs, the rows being integrally connected to each other, the individual lugs of each row being spaced from each other and integrally connected to each other, the free ends of the lugs being bifurcated.

2. A molded hard rubber tire for an automobile as defined in claim 1, wherein the connections between the rows of lugs each includes an annular strip at the sides of the bases of the lugs.

3. A molded hard rubber tire for an automobile as defined in claim 1, wherein the connections between the individual lugs each includes a rubber strip extending between the ends of the adjacent lugs.

4. A molded hard rubber tire for an automobile as defined in claim 1, wherein the connections between the rows of lugs each includes an annular strip at the sides of the lugs, and wherein the connections between the individual lugs each includes rubber strip extending between the ends of the adjacent lugs.

5. A molded hard rubber tire for an automobile as defined in cliam 4, wherein the front and rear surfaces and the top surfaces of the bifurcations are dished.

6. A molded hard rubber tire for an automobile as defined in claim 5, wherein each lug has a rectangular shaped base with a rectangular shaped body radiating therefrom, the free ends of the bodies constituting the free ends of the lugs and being bifurcated.

7. A molded hard rubber tire for an automobile wheel as defiined in claim 6, wherein the bifurcations of the bodies of the lugs are reinforced with metal inserts therein.

8. A molded hard rubber tire for an automobile wheel as defined in claim 7, wherein the insert is an elongated pointed rod.

9. A molded hard rubber tire for an automobile wheel as defined in claim 7, wherein each bifurcation is formed with a socket, the insert in the bifurcation including a metal sleeve in the socket, said sleeve having opposed holes therein, a removable flattened tubular casing inside the sleeve, said casing carrying opposed aligned pins movable toward and away from each other, said pins having adjacent bent ends, said pins adapted to be moved through the holes in the sleeve, said casing having a socket at one end and a recess at the other end, said casing having an internally threaded bore communicating with the socket and recess, coiled springs in the recess pressing against the bent ends of the pins to hold the pins against movement, said threaded bore adapted to receive the externally threaded stem of a tool adapted to engage the adjacent ends of the pins for moving said pins through the holes in the sleeve, for interlocking the casing to the sleeve.

10. A molded hard rubber tire for an automobile wheel as defined in claim 7, wherein each bifurcation is formed with a central recess and with a bore communicating with one end of the recess and intersecting one of the bifurcations and with a second bore communicating with the other end thereof, the body of the lug having a horizontal passage leading to said second bore and adapted to be connected to a source of air supply, a bellows in the recess adjacent said other end, said bellows having an open end and a closed end, the open end of the bellows communicating with the second bore, and a headed pin extending through the recess with its head fixedly seated on the closed end of the bellows, whereby passage of air into the horizontal passage passes through the second bore and inflates the bellows which in turn moves the headed pin through the first named bore outwardly of the bifurcation.

References Cited

UNITED STATES PATENTS

| | | | |
|---|---|---|---|
| 658,461 | 9/1900 | Olds | 152—324 |
| 1,500,307 | 7/1924 | Gudden | 152—324 |
| 2,165,185 | 7/1939 | Suris | 152—324 |

ARTHUR L. LA POINT, Primary Examiner

C. B. LYON, Assistant Examiner